United States Patent [19]

Reimann

[11] Patent Number: 5,111,899
[45] Date of Patent: May 12, 1992

[54] MOTORIZED ROLLING-CHAIR

[75] Inventor: Jean Reimann, Puplinge, Switzerland

[73] Assignee: Aluweld S.A., Geneva, Switzerland

[21] Appl. No.: 520,453

[22] Filed: May 8, 1990

[30] Foreign Application Priority Data

May 17, 1989 [CH] Switzerland .................. 1836/89

[51] Int. Cl.⁵ .............................................. B60K 1/00
[52] U.S. Cl. ................................... 180/65.1; 180/907; 297/DIG. 2; 297/DIG. 4
[58] Field of Search ................. 180/65.1, 65.6, 907, 180/6.5; 280/288.4, 304.1; 297/DIG. 4, DIG. 2

[56] References Cited

U.S. PATENT DOCUMENTS

| | | | |
|---|---|---|---|
| 3,952,822 | 4/1976 | Udden et al. | 180/907 |
| 4,560,022 | 12/1985 | Kassai | 180/65.1 |
| 4,798,255 | 1/1989 | Wu | 180/907 |

FOREIGN PATENT DOCUMENTS 3411489 10/1984 Fed. Rep. of Germany ...... 180/907

*Primary Examiner*—Andres Kashnikow
*Assistant Examiner*—Richard Camby
*Attorney, Agent, or Firm*—Young & Thompson

[57] ABSTRACT

The motorized rolling armchair comprises a motor-transmission assembly (1,2) the output shaft of which (3) extends on either side of the transmission gear (1) and carries at each of its ends a rolling train (4,5). The motor-transmission assembly (1,2) carries a support (6) on which are fastened batteries (7) and which is provided at its front lower end with at least a roller (8). It comprises a light casing (9) on which the seat (10) and the back (11) of the armchair, of synthetic plastic material, are directly injected. Rapid corrections (14,20) are provided to couple and uncouple the casing to the motor-transmission assembly (1,2).

1 Claim, 1 Drawing Sheet

MOTORIZED ROLLING-CHAIR

The present invention relates to motorized rolling-chairs and more particularly to the one permitting not only to displace oneself on a flat surface but also to go up and down staircases, footpasses and also similar obstacles.

Now the motorized chairs comprise all a tubular welded frame, generally made out of steel, on which are mounted an electric motor having permanent magnets, of a feeding voltage of 12 Volt generally and its speed variator, the motor being connected to a conventional battery.

The transmission from the motor to the wheels or flanges carrying the wheels is realized through a chain and pinion reducer meshing directly on the motor. The tubular welded frame is also used as support and structure for the chair itself in which the user sits.

These motorized rolling-chairs or armchairs are heavy, cumbersome and onerous due to their welded construction.

The aim of the present invention is to give to the users a rolling-chair or armchair which is handy, less cumbersome, lighter, easily transportable and at lower costs.

The motorized rolling-chair according to the invention is characterized by the fact that it comprises a motor-transmission assembly the output shaft of which extends on either side of the transmission box and carries at each of its ends a rolling train; by the fact that the motor-transmission assembly carries a support on which are fixed feeding batteries and which is provided at its front lower end with at least one roller; by the fact that it comprises a light casing on which the seat and the back of the armchair, made out of synthetic material, are directly injected; and by the fact that it comprises rapid fixing means to couple and uncouple the casing to the motor-transmission assembly.

The attached drawing shows schematically and by way of example one particular embodiment of the motorized rolling-chair according to the invention.

Figure 1:
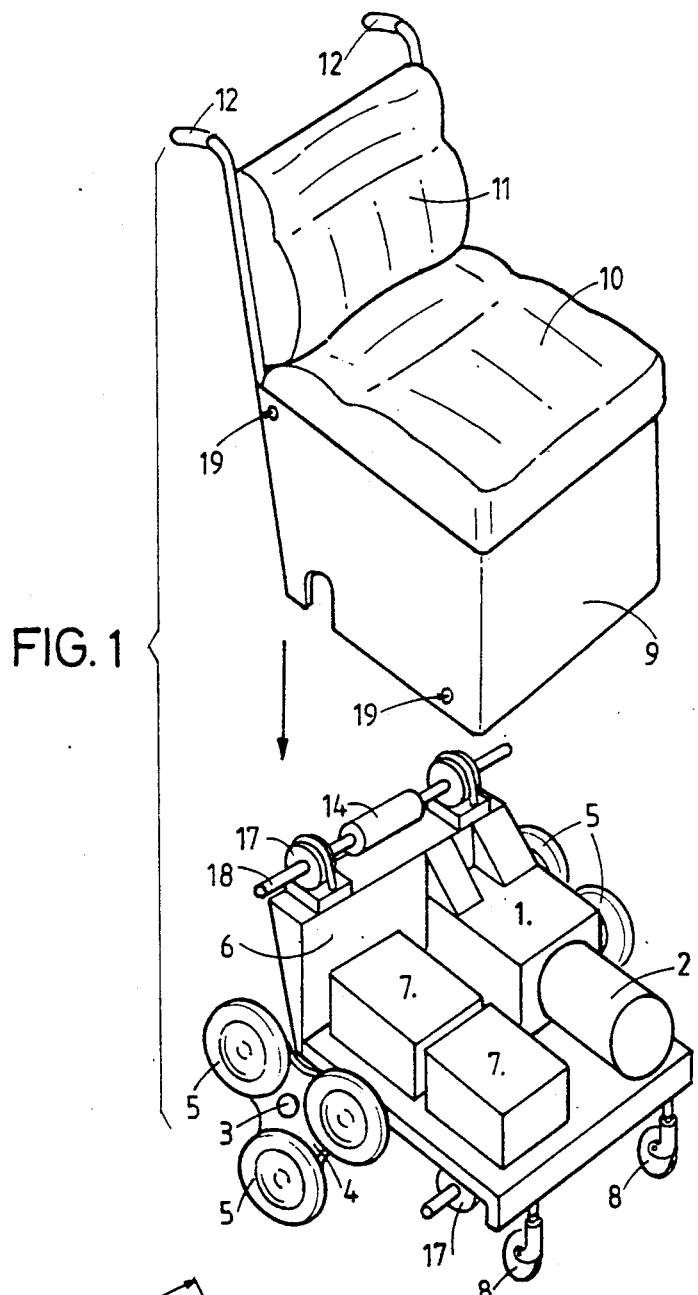
FIG. 1 is a perspective exploded view of the rolling-chair.
Figure 2:
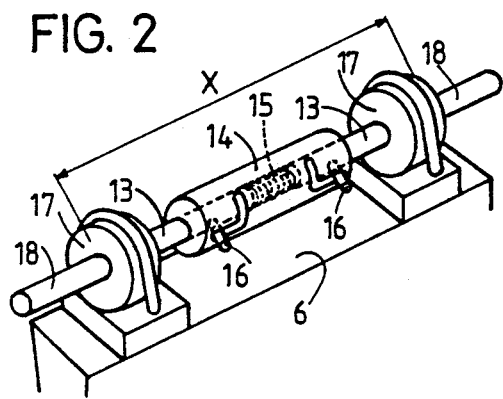
FIGS. 2 and 3 show details of the fixing of the casing of the chair on the motor-transmission assembly.
Figures 3A, 3B:
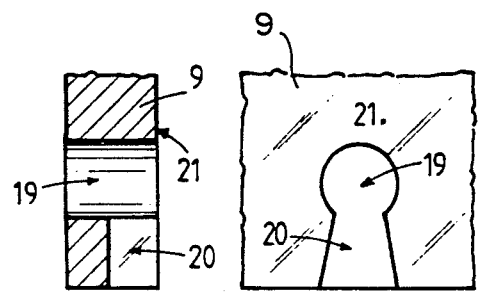

The main originality of the motorized rolling-chair shown comprises the absence of a frame, particularly of a tubular welded frame. As a matter of fact this rolling-chair comprises a motor-transmission assembly directly connected to the wheels or flanges carrying the wheels, this assembly being ridigly fixed on a support carrying front rollers or rolling-wheels and being provided with rapid and removable fixing means of the casing of the chair comprising its seat as well as handgrips for the manual displacement of the chair.

The motor-transmission assembly comprises a gear transmission gear 1 comprising an endless screw and planetary reducer directly meshing with a servo-motor of 24 Volts 2 controlled by a power amplifier. The output shaft 3 of the gear transmission 1 is rigid and receives at each of its ends a flange 4 carrying two or three wheels 5 idly pivoted on shafts fastened with these flanges.

Thus the driving assembly of motor, transmission and rolling members forms a compact assembly, which is rigid and relatively light and constitutes itself the frame of the chair.

This driving assembly is provided with a support 6 presenting a face receiving batteries 7. The front wheels or rollers 8 of the chair are idly pivoted on shafts which are themselves pivoted idly in the support 6.

Finally the support 6 comprises rapid and removable fixing means for the light casing 9 on which are fastened the seat 10 and the back 11 of the chair and comprising grips 12. This casing 9 is made in light metal and comprises honeycombed parts on which the seat and the back of the armchair, made of polyurethane foam, are directly injected.

This casing 9 can be realized in two parts, seat and back, which can fit the one onto the other to reduce the size and facilitate its transport.

The lower part or skirt of this casing 9 comprises fixing means cooperating with the rapid fixing means of the support 6 permitting thus a coupling or a separation of the casing 9 from the motor-transmission assembly in an easy and rapid manner.

The fixing means carried by the support are constituted each by two coaxial shafts 13 mounted slidingly in a tube 14 and tending to be separated the one from the other by means of a spring 15. Each shaft is provided with an actuating member 16 merging from the tube 14 through a slot having the shape of an L.

Each shaft 13 slides in a block 17 fixed on the support by means of an attachment. The ends 18 of the shafts 13 are intended to cooperate with the fixing means of the casing 9 to fix the latter removably or the motor-transmission assembly.

These fixing means of the casing are constituted by holes 19 merging into a housing 20. The distance separating the internal faces 21 of the fixing means of the casing 9 corresponds to the distance X separating the outside faces of the silentblocks 17. Thus when the shafts 13 are pressed toward each other manually or when the actuating members 16 are introduced into the part of the slot having the shape of an L which is perdendicular to the axis of the tube 13, in such rectracted position the ends 18 of these shafts 13 can then be introduced into the housings 20. Upon liberating the shafts 13, the ends are automatically introduced into the holes 19 and fix the casing onto the motor-transmission assembly.

A second set of rapid fixing means 13,18 is provided at the front end of the support 6 and cooperate with a corresponding fixing means 19,21 provided at the frontal portion of the casing 9.

The absence of a tubular frame and the removable fixing of the casing onto the motor-transmission assembly enables providing a motorized rolling-chair which is not cumbersome, light and easily transportable.

The flanges 4 provided with the wheels 5 enable the passing of obstacles such as foodsteps or steps. It is even possible to go up staircases with such a chair which has thus a particular application for the transport of persons in airports and their boarding of planes up the normal ladders.

When the motor is stopped one can displace the chair by pushing it by its grips 12.

It is evident that in variants the flanges 4 and the wheels 5 can be replaced by normal wheels in which case the motorized driving is done on a relatively flat ground.

In a general manner the wheels or the flanges carrying the wheels are directly mounted on the ends of the shaft 3 of the transmission or gear box 1 emerging from either side of it and extending under the part of the support 6 receiving the batteries 7. Because of the rigidity of this shaft 3 and its short length it is not necessary to provide bearings on the support 6 which is of a simply and low cost construction.

Other rapid fixing systems of the casing 9 provided with the seat 10,11 can be forseen for example clip fasteners or rapid closure means through an excentric. However these fixing means are preferably designed so as to be acutated without tools.

The motor-transmission assembly constitutes thus simultaneously the driving assembly and replaces completely a frame, so that it thus itself ensures, with the light support 6 which is fixed to it through screws and bolts for example, the rigidity and stability of the complete motorized rolling-chair.

The motor 2 is controlled by a servo-amplifier of great power giving control pulses to the motor at different speeds while ensuring a practically constant torque permitting stabilizing and regulating the speed of rotation of the flanges 4 whatever the applied load is particularly during the going up or down of steps or staircases.

Finally the conception of the polyurethane foam seat which is directly injected onto a portion of the casing having a honeycomb shape, the seat and the back can be separated by simple engagement and permit the provision of a light casing, which is rigid, less cumbersome since it can be easily dismantled in two parts and thus is easily transportable, but which however presents a comfortable chair. Furthermore, the back and the seat being monolithic with the corresponding part of the casing they do not need any mechanical fixing thus simplifying further the rolling-chair.

Therefore through its design, this motorized rolling-chair is light, rigid, easily dismantled for its transport and necessitates for its manufacture and assembly only a minimum of operations. Therefore it comprises a rolling-chair which is easy to use and has a much lower cost than all the existing rolling-chairs.

It is evident that the shaft 3 of the transmission gear can be a hollow shaft so as to permit providing this chair with a more complete system of motorisation enabling at will the driving in rotation either of the flange 4 or of the wheels 5 pivoted on this flange 4. This is obtained as described in detail in Swiss patent application No. 1836/89. A control shaft, actuated by a manual member slides axially in the end of each hollow shaft 3 and controls the axial displacements of a toothed pinion meshing either with a toothed crown carried by the flange 4 or with toothed wheels fastened to the wheels 5.

Thus when the flange 4 is driven in rotation the rolling-chair is adapted to go up or down steps or staircases wherear when the individual wheels 5 are driven the chair can displace itself on a flat surface, resting on two wheels 5 of each flange 4.

Finally if the control shaft of the pinion is hollow, one can incorporate in it a control rod, actuated by a fork, actuating a brake acting on the wheels 5 pivoated on the flange.

Thus this motorized rolling-chair satisfies all security and performance requirements.

I claim:

1. Motorized rolling-chair, comprising a motor-transmission assembly, an output shaft of which extends on either side of a transmission gear and comprises at each of its ends a rolling train; the motor-transmission assembly carrying a support on which are fastened batteries and which is provided at its lower front end with at least a roller; a casing on which the seat and the back of the armchair, in synthetic material, are directly injected; and rapid fixing means to couple and uncouple the casing to the motor-transmission assembly, wherein the rapid fixing means of the casing onto the motor-transmission assembly comprise at least one telescopic member fastened to the support by blocks, the ends of this telescopic member being adapted to cooperate with holes provided in the casing.

* * * * *